Figure 1:
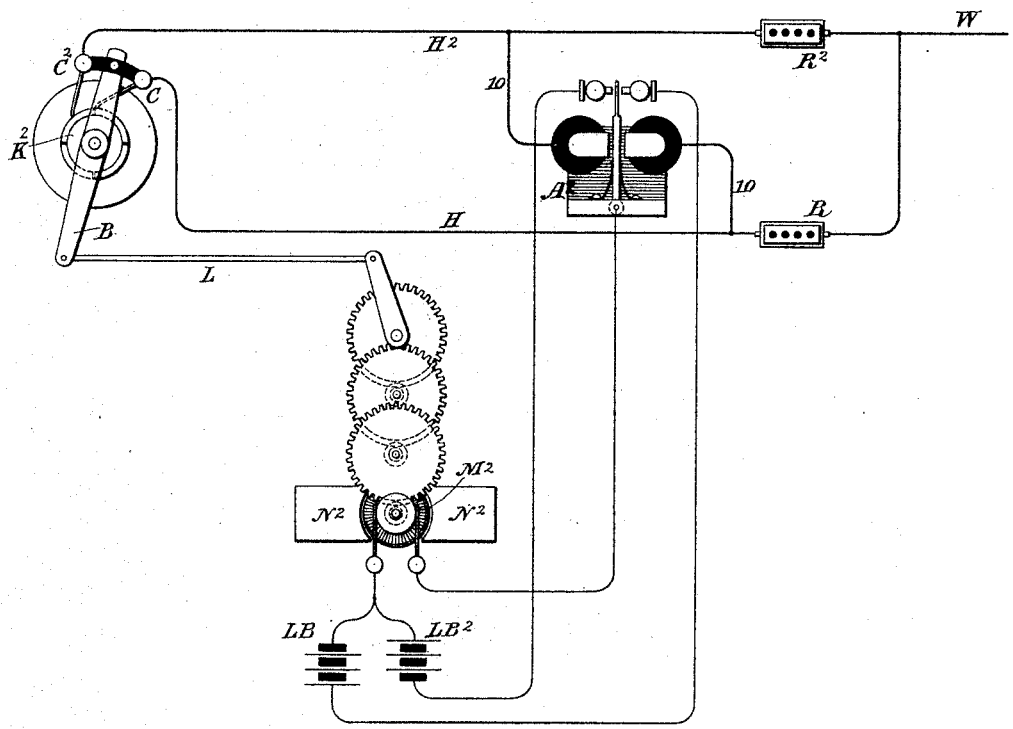

(No Model.) 2 Sheets—Sheet 1.

C. L. BUCKINGHAM.
COMMUTATOR ADJUSTER FOR DYNAMO ELECTRIC MACHINES.

No. 357,115. Patented Feb. 1, 1887.

Witnesses
Geo. W. Breck
Wm. S. Capel

Inventor
C. L. Buckingham
By his Attorneys
Townsend & MacArthur (No Model.) 2 Sheets—Sheet 2.
C. L. BUCKINGHAM.
COMMUTATOR ADJUSTER FOR DYNAMO ELECTRIC MACHINES.

No. 357,115. Patented Feb. 1, 1887.

Witnesses
Geo. W. Breck.
Carrie E. Ashley.

Inventor
C. L. Buckingham
By his Attorneys
Townsend & MacArthur

UNITED STATES PATENT OFFICE.

CHARLES L. BUCKINGHAM, OF NEW YORK, N. Y.

COMMUTATOR-ADJUSTER FOR DYNAMO-ELECTRIC MACHINES.

SPECIFICATION forming part of Letters Patent No. 357,115, dated February 1, 1887.

Application filed August 5, 1886. Serial No. 210,151. (No model.)

*To all whom it may concern:*

Be it known that I, CHARLES L. BUCKINGHAM, a citizen of the United States, and a resident of New York, in the county of New York and State of New York, have invented certain new and useful Means for Adjusting the Commutators for Dynamo-Electric Machines, of which the following is a specification.

It is well known in the art that in the operation of dynamo-electric machines freedom from burning and sparking at the commutator of the machine is best secured when the brushes of the commutator are set in a certain position with reference to the neutral line, or line on which the polarity of currents in the armature changes, and that a change in the magnetic strength of the field, the speed of rotation, or other conditions resulting in a shifting of the neutral line necessitates a shifting of the commutator-brushes in order that the best relation of commutator and neutral line may be maintained.

The object of my invention is to provide a means whereby the brushes may be automatically shifted or adjusted to follow any changes or shiftings of the neutral line.

My invention consists in the combination, with an adjustable commutator, of two brushes insulated from one another, having separate connections to the circuit, and so applied that by a shifting of the neutral line (or of said brushes with relation to the line) the potential of one brush shall increase while that of the other diminishes, and a governing or controlling electro magnet or magnets for governing or adjusting the commutator and properly connected with the two separate brushes, so that normally the currents passing from said brushes to the general circuit are balanced on the magnet or magnets, while if the current in one branch or the other increases, the other in the meantime diminishing, such balance will be destroyed, the magnet will be rendered active, and the brushes of the commutator will be properly moved to follow the shifting neutral line.

The balance desired for the controlling or actuating magnet or magnets or armature may be either an electrical balance such as would be secured by placing the magnet in a bridge-wire connecting the branches leading from the two brushes, or a magnetic balance such as would be produced by winding the magnet differentially with two oppositely-acting sets of coils, one set carrying current from one brush and the other carrying current from the other brush, or may be secured by the analogous method of allowing the current from each brush to exert its full magnetic effect, and causing the developed magnetisms to exert counter mechanical pulls upon an armature-lever. Means for securing such a balance of effects are well known in the art and in duplex telegraphs, where it is desired to secure an artificial balance or the compensation of the effects of currents in a main and an artificial line upon a receiving-instrument. The first specified arrangement used is the well-known Wheatstone-bridge duplex, while the other two are modifications of the differential duplex.

In carrying out my invention I may make the magnet act either as a controller-magnet, which shall throw into and out of action suitable motor mechanisms for moving the commutator-brushes, or the magnet may itself be the motor-magnet, in which case I prefer to make it in the form of a rotary electric motor.

Figure 2:
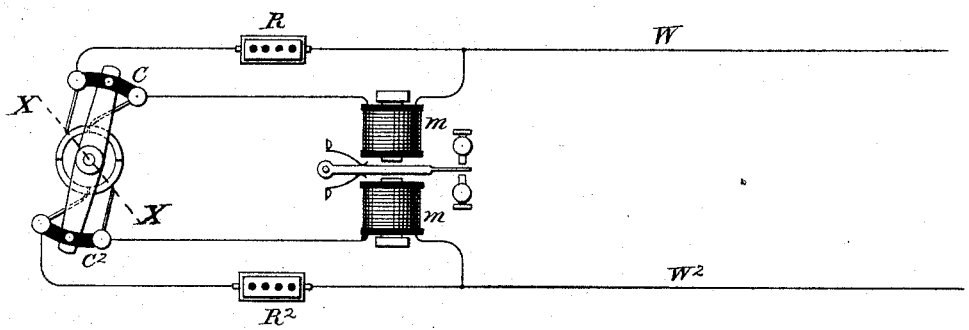
Figure 3:
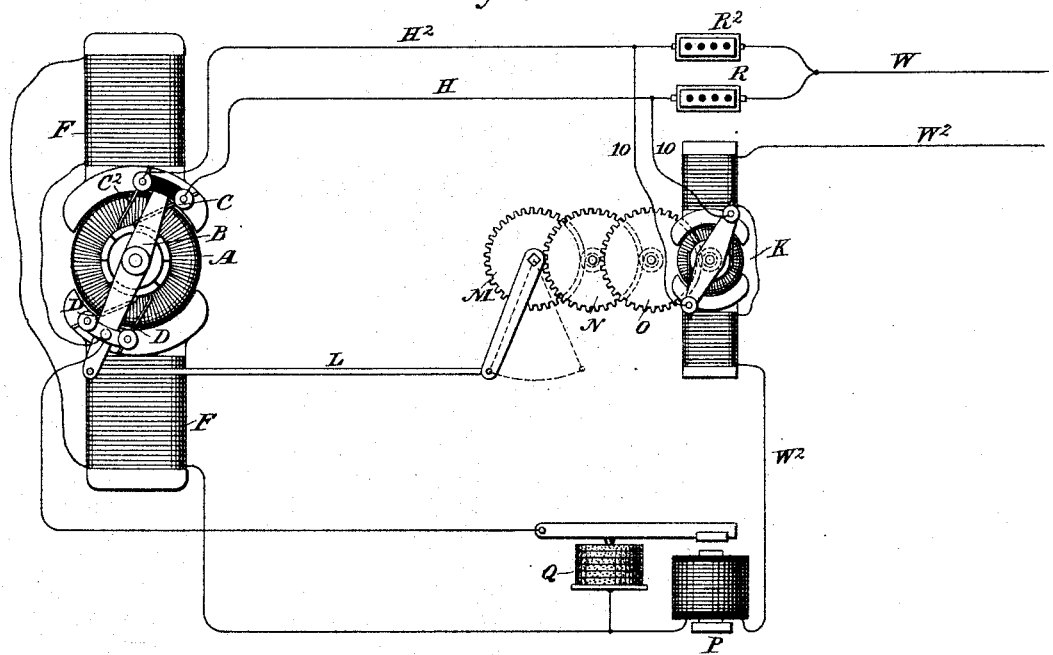
Figure 4:
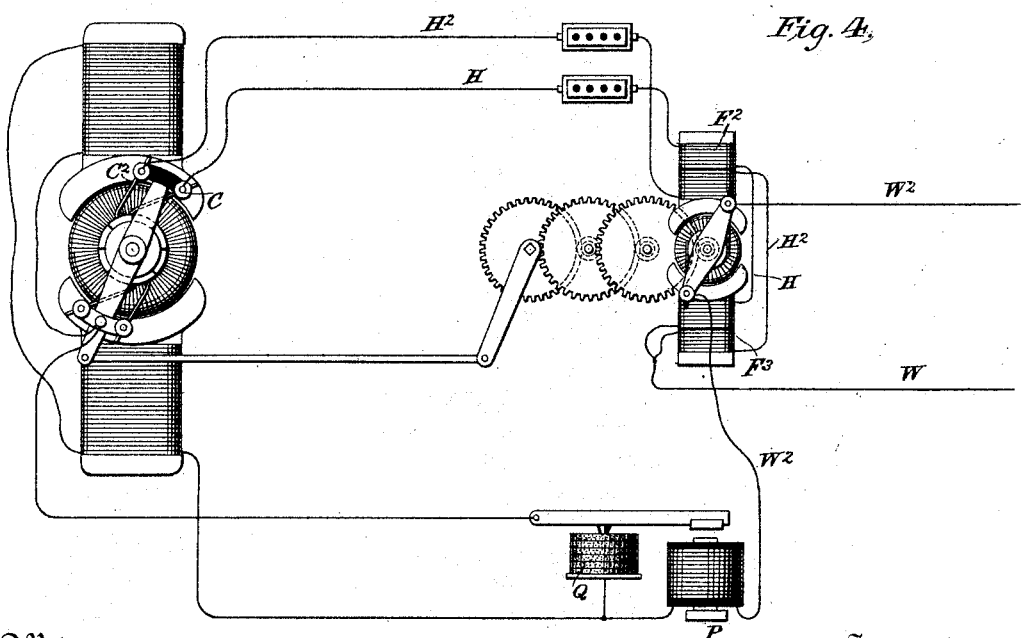

In the accompanying drawings, Figure 1 is a diagram illustrating one arrangement of circuits and apparatus for carrying out my invention. Fig. 2 is a diagram illustrating an equivalent arrangement. Fig. 3 is a diagram illustrating arrangements of circuits and apparatus in which the controlling or operating magnet on which currents from the two brushes are balanced consists of an electric motor geared with the movable support of the commutator-brushes. Fig. 4 illustrates a diagram of circuits and apparatus in which the currents from the two brushes are normally balanced with respect to the electric motor by the employment of a differential winding of the field-magnets for the motor.

I shall hereinafter describe my invention as applied to the commutator for a dynamo-machine constructed after the principle described in Letters Patent to D. A. Schuyler, No. 261,392.

Referring to Fig. 1, $K^2$ indicates the commutator-cylinder for a dynamo having its armature wound in accordance with said patent, and B² a movable yoke or support for carrying two commutator-brushes, C C², which in the present case are applied to the same side of the commutator-cylinder, so as to be both of the same polarity, and are suitably mounted so as to be electrically insulated from one another on their support.

The brushes C C², while forming the two brushes of my invention, serve also as the ordinary collecting-brushes of the dynamo, and are suitably applied to the commutator-cylinder, so that if the yoke supporting them be moved, thus moving the two brushes over the periphery of the cylinder, the potential of one brush will increase, while that of the other will diminish. The brushes C C² have separate connections, H H², to the general circuit W, and in each separate connection is included an artificial resistance, R R², which is of service when the Wheatstone-bridge plan is employed in assisting to locate the connections of the bridge so that there shall be an equality of potential at its two terminals.

A² indicates an electro-magnet included in a bridge-wire, 10, connecting the two branches H H². The magnet is here illustrated as an ordinary polarized relay whose armature is normally centered between two contact-stops, so that when the magnet is not excited by current in branch 10 the armature will be held out of contact with both stops.

The bridge-wire 10 is connected to the two branches H H² at such points that, having regard to the potential of the brushes C C² when in normal position and the amount of the resistance R R², there will be an equality of potential at the terminals of the bridge, and no current will flow over it. If, now, under such conditions, the neutral line of the machine shift from any cause, it is obvious that the potential of one brush—as, for instance, brush C—will increase, while that of brush C² will correspondingly diminish, and there will consequently be a flow of current over the bridge from branch H to branch H², thus exciting the magnet in a way to draw the armature in a certain direction.

If the neutral line should shift in the opposite direction, the brush C² would acquire a greater potential and the brush C a lesser potential, thus causing the current to flow from branch H² to H, or in the opposite direction, so as to move the armature in the opposite way. By any suitable means the movements of the armature thus produced may produce movements of the support for the commutator-brushes, so as to restore the brushes to the original position with relation to the neutral line.

For the sake of illustration I have shown herein an electric motor for doing this work, which motor is caused to rotate in one direction or the other, according to the position of the relay-armature, by means of two batteries, L B L B², connected oppositely into branches from the two contact-stops of the relay, so that if the relay-circuit be closed by one stop battery L B will flow in a certain direction through the armature of the motor, while if the circuit be closed on the other stop battery L B² will flow, but with a current of opposite polarity, so as to cause the motor to rotate in the opposite direction.

M² indicates the armature of the motor, and N² N² the field-magnets, formed as permanent magnets.

L is a link which connects the movable yoke B with an arm projecting from the shaft of a wheel that is geared to the electric motor.

The operation of the apparatus as thus arranged and constructed would be as follows: Normally no current flows over the bridge 10, because of the balance effected by connecting said bridge at points of equal potential on the branches H H². This balance may be produced either by an adjustment of the resistance or by a particular setting for the brushes. The best results would be obtained by the employment of equal resistances in the two branches and of an arrangement of the brushes such that normally, or when the commutator is in its best position of adjustment, there will be an equal potential at the two brushes C C². If, now, under such conditions, the field-magnet of the machine from any cause decrease in power, the neutral line will tend to shift backward, or in a direction opposite to the direction of rotation of the armature, with the effect of decreasing the potential of brush C² and increasing that of brush C. A current will thereupon flow from branch H to branch H² over the bridge, thus affecting the magnet so as to throw the armature-lever against one of its stops and bring into circuit one of the batteries L B L B². The motor will thereupon begin to rotate, and with a proper connection of parts and arrangement of polarity the motor will move the support B in a direction to carry the brushes C C² backward in the direction of the shift of the neutral line. This movement will continue until the potentials of the two brushes respectively are restored to normal, whereupon current will cease to flow in the bridge, and the armature of the relay will resume its normal position, thus throwing the motor out of action and bringing the commutator-brush to rest. It is obvious that the same kind of an adjustment would be effected if the movement of the neutral line should be in the opposite direction, so as to increase the potential of brush C² and decrease that of C. In this instance the balance on the relay A² will be destroyed and the current will flow on the bridge 10 in an opposite direction, so as to throw in a battery of the opposite polarity and cause the motor to move in a direction to move the brushes forward until there is a restoration of the potentials to normal.

In Fig. 1 the currents flowing from the two brushes are balanced by establishing an equality of electric potential at the terminals of a bridge-wire.

In Fig. 2 I have shown an arrangement wherein the balance is a magnetic balance effected by the employment of two electro-magnet coils acting on cores which tend to pull a lever in opposite directions. In this figure, however, I have shown the two brushes as of opposite polarity. Brush C is the rear brush of one of the compound collecting-brushes of the machine, but is suitably insulated from the second brush of the same polarity, and is connected to the main circuit W through the coils of an electro-magnet, m. Brush C², which is of the opposite polarity, is the leading brush of the pair on the opposite side of the commutator, and is also properly insulated from the brush that is on the same side of the commutator with it. Brush C² is connected with the other pole of the main circuit W² through a similar electro-magnet, m.

The neutral line being the line X X, (indicated in dotted lines,) it is apparent that any movement of said line or any movements of the two brushes C C² will result in increasing the potential and current flow from one and simultaneously decreasing the potential and current flow from the other.

Under proper conditions of adjustment, so that there is an equality of flow from said brushes, the magnets m m will exert equal pulls on the armature, which will be held in a central position.

On a shifting of the neutral line, resulting in a change of the current flow from the two brushes, the power of one magnet will increase, while that of the other will diminish, and the armature will be thrown in a certain direction. If the shifting of the neutral line be in the opposite direction, there will be a change of electric condition in the two brushes, which will result in increasing the power of the magnet which was before weakened and decreasing the power of the other magnet, so that the armature will move in the opposite direction.

It will be obvious that the movements of the armature may be utilized in the manner before explained, or in any other suitable way, to cause a movement of the yoke or support for the commutator-brushes in a proper direction to compensate for the shifting of the neutral line, and to bring the brushes to a position where they will have the proper relation to the neutral line, as already explained.

If desired, artificial resistances R R² may be employed approximately equal in amount, respectively, to the resistance of the coils of magnets m m.

I do not limit myself to making the magnets m m of exactly the same power, since it would obviously be possible to set the brushes C C² so that under the normal conditions one would deliver a little more current than the other, in which case it would be necessary that one of the magnets should be weaker than the other, in order that a balance might be maintained during normal working of the machine.

In Fig. 3 I have illustrated an arrangement in which, instead of employing a controller-magnet that brings into action a second electromotor, I arrange the electric motor itself so that the currents taken off from the two brushes are normally balanced with respect to the same, and gear said motor directly with commutator-adjusting mechanism. In this figure, also, I have shown the application of the invention to a current-regulating device which operates by changing the strength of the magnetic field in which the armature of the dynamo moves.

P indicates the electro-magnet of the current-regulator, and Q an artificial resistance placed in a shunt or branch around the field-magnet coils F F of the dynamo, so that on an increase of current strength on the circuit W W² the magnet P will act on the artificial resistance Q, consisting of a pile of carbon blocks, and will decrease the resistance in the branch around the field-magnet coils, so that current will be diverted from said coils and the field-magnet will decrease in power.

The field-magnet coils of the electromotor K are placed in the circuit W², in order that they may have a constant effect, so as to keep the polarity of the field-magnets of the motor always the same. This being done, it is simply necessary to connect the armature of the motor into the bridge-wire 10 10 in any suitable way, and under the conditions supposed a flow of current over the bridge-wire 10 in one direction will cause the motor to move in a direction to shift the commutator-brushes of the dynamo in a certain direction, while the flow of current over the bridge-wire in the opposite direction will reverse the motor and cause a movement of the dynamo-brushes in the opposite direction.

The brushes C C² of the dynamo are insulated from one another and are normally of the same polarity. The brushes B B, which are of the opposite polarity, are connected through the field-magnet coils F and regulator-magnet P to the circuit in the usual way. Brushes C C² connect with the circuit through branches H H² and resistances R R², and together supply current to the wire W in the ordinary way.

The bridge 10 10 is connected at points of equal potential on the branches when the brushes C C² are at the normal or proper position with relation to the neutral line.

A change of the position of the neutral line will change the potential of the brushes, as already explained, thus establishing a difference of potential at the terminals of the bridge 10 10, and a current will flow over said bridge in one direction or the other, according to the nature of the change at the brushes C C².

The armature of the electromotor gears through wheels O N with a wheel, M, whose shaft carries an arm connected by a link, L, with the movable yoke D for the commutator-brushes.

The general operation of the apparatus is not substantially different from that already described. When the regulator-magnet P acts so as to decrease the magnetism of the field-magnets F, the neutral line will shift backward, requiring a shifting of the commutator, in order that the brushes may maintain the original or proper position with regard to said line. This adjustment is effected through the change of potential in the brushes $C$ $C^2$ produced by the shifting of the line and the consequent disturbance of the balance of the currents from said brushes on the electro-magnet, formed in this case of the armature of the motor, so that a current will flow in said armature and will move the commutator-adjusting mechanism in a direction to shift the brushes backward until the original or normal position with relation to the neutral line is secured.

In Fig. 4 I have illustrated a modification in which the currents from the two brushes are balanced on an electric motor by winding the field-magnet coils of the same differentially. The electric motor is constructed and geared to the brush-shifting mechanism in substantially the manner illustrated in Fig. 3. The armature of the electric motor is connected into the circuit W $W^2$ in the manner indicated, so as to be always of the same polarity. The reversals of direction are in this instance effected by reversing the polarity of the field-magnets of the motor. As will be seen, each field-magnet is provided with two sets of coils, one set included in the branch H and the other set in the branch $H^2$, leading to the wire W.

On the field-magnet $F^2$ of the motor the two sets of coils are wound oppositely, so that the currents in the branches H $H^2$ will have no effect in developing magnetism in the field-magnet poles. The coils of the field-magnet $F^2$ are similarly wound; but that pole which tends to produce a south polarity in the field-magnet $F^3$ is in circuit with the coil upon the field-magnet $F^2$, which tends to produce a north polarity. Similarly, the two other coils on the field-magnets connected in circuit with one another, if unopposed, produce, respectively, a north and a south magnetism in the two field-magnet poles.

Under normal conditions the field-magnet of the motor is not excited. If, however, a shifting of the neutral line occur, so that more current flows in H than in $H^2$, the balance established on the field-magnets will be disturbed, and the coils which are in the circuit H will prevail and will give to the field-magnet poles a certain polarity, causing the armature of the motor to move in a certain direction, which by the gearing is made such as to shift the brushes in a direction to restore the brushes C $C^2$ to the normal or proper position with relation to the neutral line. If the shifting of the neutral line be in the opposite direction, so that more current flows in branch $H^2$ than in H, the coils in the branch $H^2$ will prevail and will give to the field-magnets an opposite polarity to that supposed in the first instance, and will cause, therefore, a revolution of the motor in the opposite direction, or in a way to move the commutator-adjusting mechanism so as to restore or move the brushes to proper position with relation to the neutral line. When the adjustment has been effected, the currents in the branches H $H^2$ will become normal, and the balance on the field-magnets of the motor being restored, the motor will come to rest through the killing of the field-magnetism.

Many other variations of my invention will suggest themselves to those skilled in the art.

I do not limit myself to any particular mechanism, since the essence of my invention consists in the employment of the two brushes and in causing the currents from said brushes to be normally balanced upon electrical devices which operate upon or control the commutator-adjusting mechanism in such way that on a destruction of the balance the electrical devices will come into action and move or shift the brushes, in the manner already explained.

What I claim as my invention is—

1. In a dynamo-electric machine, an adjustable commutator provided with two brushes insulated from one another and connected to the circuit by independent branches carrying normally-balanced currents to the circuit, by the differential action of which said commutator is adjusted, as and for the purpose described.

2. The combination, with an adjustable commutator, of a governing or operating electro magnet or magnets and two separate commutator-brushes delivering to the general circuit currents normally balanced with respect to the electro magnet or magnets, as and for the purpose described.

3. The combination, with an adjustable commutator, of two commutator-brushes insulated from one another, independent connections from the same, an electro-magnet on which the currents delivered to the general circuit through the two said connections are normally balanced, and mechanism for adjusting the commutator operated by said magnet when the latter responds to a difference in the currents flowing from the two brushes.

4. The combination, with a dynamo-electric machine having an adjustable commutator, of two commutator-brushes insulated from one another and of the same polarity, an electro-magnet having electrical connections to the circuits of both brushes and normally quiescent while the brushes are of the same potential, and mechanism governed by said magnet for adjusting the commutator on an energization of the magnet through a difference in electrical condition of the two brushes.

5. The combination, with an adjustable commutator, of a compound commutator-brush whose two portions are insulated from one another and are joined to the circuit by separate branches or connections, mechanism for adjusting the commutator, and a governing magnet or magnets responsive to changes of polarity and normally in neutral condition with respect to the currents passing to the general circuit through the two branches, as and for the purpose described.

6. The combination, with the adjustable commutator, of an operating electric motor and two commutator-brushes insulated from one another and delivering to the general circuit separate currents normally balanced with respect to the motor, whereby on a disturbance of the balance on either side the motor may be caused to rotate in a direction to set the commutator in position where the balance will be renewed.

7. The combination, with the separate commutator-brushes of the same polarity, of an electro-magnet in a bridge-wire and an adjustable commutator whose position is controlled by said magnet.

8. The combination, with an adjustable commutator, of two separate commutator-brushes of the same polarity having separate connections to the circuit, and an electric motor placed in a bridge-wire joining said connections and geared to the adjustable commutator.

9. The combination, with an adjustable commutator and an operating or governing magnet, of two commutator-brushes of the same polarity separately connected to the circuit, an artificial resistance in each connection, and a bridge-wire containing the magnet, as and for the purpose described.

10. The combination, with a dynamo-electric machine, of an adjustable commutator, two commutator-brushes having independent electrical connection with the general circuit, said connections carrying current at all times to said circuit, an adjusting mechanism, and devices responsive to a difference in the flow of current in said connections for controlling or operating the adjusting mechanism.

11. The combination, with a dynamo-electric machine, of an adjustable commutator, controlling or operating magnetic devices, and two commutator-brushes having independent connections to the general circuit, each of which, while carrying current to the general circuit, forms a compensating circuit to the other, so as to normally prevent the magnetic devices from acting.

Signed at New York, in the county of New York and State of New York, this 30th day of July, A. D. 1886.

CHARLES L. BUCKINGHAM.

Witnesses:
WM. H. CAPEL,
WM. ARNOUX.